2,805,948

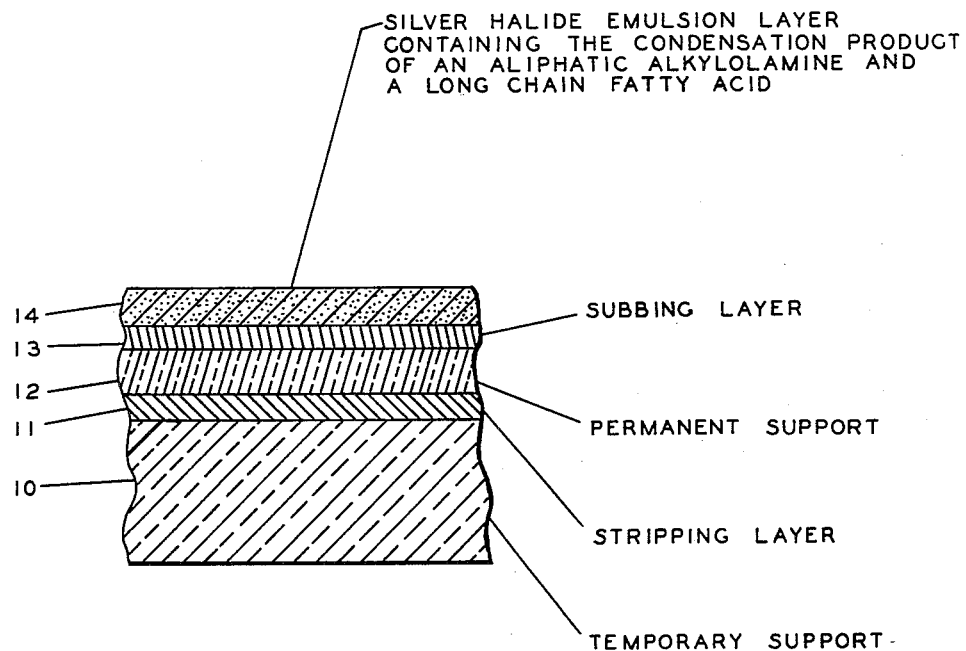

PHOTOGRAPHIC STRIPPING FILM

Francis H. Gerhardt, Binghamton, and Benjamin R. Harriman, Rochester, N. Y., assignors to General Aniline & Film Corporation, New York, N. Y., a corporation of Delaware Application June 27, 1955, Serial No. 518,386

12 Claims. (Cl. 96—83)

This invention relates to photography and more particularly to photographic stripping films for the graphic arts. Still more particularly, it relates to stripping films with improved restripping characteristics.

Stripping films depend for their stripping characteristics upon a special interlayer. This interlayer is a water-soluble adhesive layer joining the permanent and temporary supports, or a water-insoluble auxiliary layer of cellulose ester, cellulose ether, synthetic resin or other water-insoluble colloidal material which is compatible with the permanent support and incompatible with the temporary support. The adhesion between this interlayer and the temporary support is sufficient to permit emulsion coating, slitting, and other film handling operations including development, but the adhesion is low enough to permit continuous and rapid stripping of the permanent support from the temporary support at any time after development. Such stripping films are well known in the art and are described in a number of patents, including U. S. 2,088,145, 2,089,460, 2,266,435, 2,275,617, 2,330,905, 2,614,932, 2,638,417 and others.

In the course of normal processing, the emulsion layer and its permanent support are stripped from the temporary support. The wet strip film is placed emulsion down on a smooth glass plate. In advertising photography, it is frequently necessary to cut off sections of a transfer photograph and replace them by other pictures or by lettering. It is then necessary to remove parts or all of this film from the glass plate, either immediately or after the film has been dried. This restripping requires very intricate work since the thin emulsion membrane is easily damaged. If the film has been allowed to dry, the back of the film is moistened again to facilitate restripping. However, in spite of this, the film cannot always be restripped without damage which means, in actual practice, that a new picture has to be taken, developed, transferred to the glass plate, etc., with the obvious risk that the new picture will again tear on restripping.

It is, therefore, an object of the instant invention to provide a stripping film which can be readily restripped from a smooth glass plate without tearing and without damaging the thin membrane consisting of the permanent support and the gelatin layer which bears the silver image.

Other objects will appear hereinafter.

We have found that restripping from the smooth surface of the glass plate without tearing of the permanent support and of the image carrying gelatin layer can be accomplished by adding to the silver halide emulsion prior to coating, a surface active agent prepared by the condensation of an aliphatic alkanolamine, preferably a low molecular weight secondary or tertiary amine having at least one alkanol group with a mono- or di-basic fatty acid or functional derivative thereof.

These condensation products are prepared in accordance with the process described in U. S. Patent 2,089,212 by reacting at least one molar equivalent of an aliphatic secondary or tertiary amine having at least one alkylol group and not more than a total of 9 carbon atoms, e. g., diethanolamine, di-isopropanolamine, ethanol-isopropanolamine, ethanol isobutanolamine, diethylaminoethanol, triethanolamine or tri-isopropanolamine with one molar equivalent of a fatty acid having from 12 to 22 carbon atoms or with a functional derivative of such acid, such as the ester, the anhydride, or the acid halide.

Suitable acids include lauric acid, myristic acid, palmitic acid, stearic acid, arachidic acid, behenic acid and oleic acid. Mixtures of acids such as those prepared by the hydrolysis of animal and vegetable fats or oils are equally suitable in spite of the fact that they contain small amounts of acids containing less than 12 carbon atoms such as butyric, caporic, caprylic and capric acids.

This invention is not limited to the use of mono basic acid but includes the use of the condensation products of secondary and tertiary alkylol amines with dibasic acids such as thapsic acid and japonic acid. Particularly suitbale are succinic anhydrides which are substituted in α-position to one of the carboxy groups by an alkenyl chain having at least 8, but not more than 18 carbon atoms. These substituted succinic anhydrides are commercially available but may be prepared by reacting hydrocarbon of the olefine series with maleic anhydride under the conditions described on pages 6 and 7 of Flett and Gardner's book "Maleic Anhydride Derivatives" published by John Wiley and Sons, New York (1952). The resulting alkenyl-substiuted succinic anhydride is then condensed with approximately one mole of the secondary or tertiary alkylolamine to yield the alkylamino alkyl ester of the alkylene succinic acid.

The effective concentrations of these surfactants depend upon the particular emulsion used and upon other additions present in and modifying these emulsions, but generally the range of 0.1 to 3 grams of surfactant per kilogram of liquid emulsion or from 1 to 30 grams of surfactant per kilogram of dry gelatin used in the preparation of the emulsion is effective.

The preferred embodiment of the invention is to add the surfactant to the emulsion during the making or ripening, or to the melted emulsion just before coating. An alternative method is to apply the surfactant as a separate layer over the emulsion as a rinse. In the latter case, the concentration of the rinsed solution should be adjusted so that the emulsion layer, after drying, contains about the same quantity or surfactant as specified above.

It is known that surface active agents have been added to photographic emulsions prior to coating for various purposes, one of the most important being that as a spreading agent to facilitate the even coating of the emulsion upon the support. For this purpose, saponin has been extensively used for a long time but there are other snythetic surfactants which will also perform this function. Any surface active agent that is added to an emulsion must, of course, meet certain routine requirements such as freedom from photographic activity and compatibility with all of the other ingredients that are added to a gelatino silver halide emulsion. The surfactants must not cause objectionable increase in viscosity during the holding of the emulsion prior to coating and should not cause excessive foaming and frothing. However, neither saponin nor any of the synthetic surfactants heretofore used imparts the desired restripping characteristics to photographic stripping film.

The invention is illustrated by the accompanying drawing which shows in cross section a stripping film carrying on the temporary support 10, a stripping layer 11, a permanent support 12, a subbing layer 13, and a silver halide emulsion layer 14 containing the condensation product of an aliphatic alkylolamine and a long-chain fatty acid.

The invention will be further illustrated by the following examples but it is to be understood that the invention is not restricted thereto.

*Example I*

A substantially fully esterified cellulose acetate film having a combined acidic acid content of about 60% and serving as the temporary support is provided with a stripping layer or interlayer containing about 90% ethyl cellulose and 10% cellulose acetate. Over this interlayer, there is cast a cellulose nitrate layer which serves as the permanent support. This layer is provided with a subbing layer.

Ten kilograms of a fine grain, high-contrast silver chlorobromide emulsion containing 670 grams of gelatin and 690 grams of silver halide were melted and to it were added 15 grams of saponin, 4 grams of a 40% aqueous formaldehyde solution, and 7.5 grams of the monodiethylamino ethyl ester of dodecenyl succinic acid prepared by reacting molar equivalents of β-diethylaminoethanol and dodecenyl succinic anhydride.

This emulsion was coated on the subbed stripping film; the dried coating had a thickness of about 7 m$\mu$. A type material was prepared in an identical manner except that the monodiethylamino ethyl ester of dodecenyl succinic acid was omitted and saponin was used as the only surfactant. The two films were then exposed and developed, fixed and washed in a normal fashion. After stripping off the temporary supports, both films were transferred emulsion sides down to smooth clean glass plates. After drying, the first emulsion containing the monodiethylamino ethyl dodecenyl succinic acid ester was easily restripped from the glass plate, whereas the type emulsion containing only saponin as a surfactant adhered strongly to the glass plate and could not be separated from the latter without tearing.

*Example II*

Ten kilograms of a fine grain silver chlorobromide emulsion containing 700 grams of gelatin were melted and to it were added 10 grams of saponin, 3 grams of a 40% aqueous formaldehyde solution, 75 milligrams of the iodide of the orthochromatic sensitizing dye described in Example 12 of U. S. Patent 2,289,300, and 6.5 grams of the condensation product of diethanolamine and coconut oil fatty acids prepared in accordance with Example 3 of U. S. Patent 2,089,212.

This emulsion was coated onto the subbed strip film described in Example 1 of U. S. Patent 2,275,617. The permanent support carrying the emulsion was processed, stripped, and transferred, emulsion side down, to a glass plate. It could be easily restripped, while a similar film which contained only saponin but none of the condensation product adhered strongly to the glass plate and tore when an attempt was made to restrip it from the plate.

*Example III*

A substantially fully esterified cellulose acetate butyrate film base containing 30% acetyl and 6% butyryl and serving as the temporary support was hydrolyzed on its surface by treatment with an aqueous alcoholic solution containing 2% potassium hydroxide. The surface-treated temporary support was rinsed and dried and then provided with a stripping layer applied from the following solution:

| | |
|---|---|
| Cellulose acetate (45% combined acetic acid) gms | 25 |
| Acetone cc | 681 |
| Isopropanol cc | 77 |
| Water cc | 72 |
| Methanol cc | 170 |

The stripping layer was dried and overcoated with a cellulose nitrate dope. The resulting cellulose nitrate layer which serves as the permanent support, was subbed with a subbing solution containing gelatin and cellulose nitrate in a solution of equal parts of methanol and acetone and a small amount of water.

Ten kilograms of a fine grain silver chloride emulsion containing 650 grams of gelatin were melted and to it were added 10 grams of saponin, 10 grams of glyoxal, 50 milligrams of an orthochromatic sensitizing dye and 8 grams of the condensation product of 2 moles of coconut oil fatty acid and 3 moles of diethanolamine prepared in accordance with Example 18 of U. S. Patent 2,089,212.

The resulting emulsion was coated onto the stripped film and dried. After exposing, developing, fixing and washing in the customary fashion, it could be easily restripped from a glass plate, whereas a comparison emulsion containing only saponin as a surfactant strongly adhered to the glass plate and could not be restripped without damage and tearing.

*Example IV*

Example III was repeated with the exception that the 8 grams of the condensation product of diethanolamine and coconut oil fatty acid were replaced by 7.5 grams of a mixture of diethanolammonium salt and the diethanol amide of long chain fatty acids commercially available under the trade name 'Clavodene" and sold by the Dexter Chemical Corporation of New York, New York.

This emulsion was coated and the resulting film could be restripped after processing from a dry glass plate without damage to the delicate pellicle.

*Example V*

A mixture of 75 grams of maleic anhydride, 0.3 gram of catechol and 203 milliliters of 2-decene were heated with vigorous stirring for 4 hours at 98° C. The reaction mixture was vacuum distilled. To 182 grams of the resulting decenyl succinic anhydride (B. P. 158–160° C./2.0 mm.) there were added from a dropping funnel under stirring, 234 grams of freshly distilled diethylaminoethanol. Stirring was continued for 5 minutes after the exothermic reaction had been completed.

Six grams of the monodiethylamino ethyl ester of decenyl succinic acid thus prepared were added together with 12 grams of saponin to 10 kilograms of a fine grain high-contrast silver chlorobromide emulsion which contained an orthochromatic sensitizing dye and a small amount of formaldehyde. This emulsion was coated onto the subbed dry stripping film described in Example III. The completely processed film could be easily restripped from a glass plate, whereas a type film in which the emulsion contained saponin as the only surfactant could not be restripped without tearing.

Our invention is capable of numerous variations as far as the composition of the temporary and permanent supports, the stripping layers, subbing layers, and the emulsion are concerned. For instance, a bromide and chlorobromoiodide emulsion can be used in place of the chloride and chlorobromide emulsion described in the several examples, while the cellulose nitrate permanent supports can be replaced by permanent supports composed of highly acylated organic cellulose esters. Therefore, we do not intend to be limited in the patent granted except as necessitated by the appended claims.

We claim:

1. A photographic stripping film comprising a cellulose organic ester temporary support, a stripping layer, a cellulose ester permanent support carrying a light sensitive silver halide emulsion layer, said light sensitive emulsion containing as a surfactant, the condensation product of an aliphatic alkylolamine and a fatty acid having from 12 to 22 carbon atoms.

2. A photographic stripping film comprising a cellulose organic ester temporary support, a cellulose ester permanent support carrying a light sensitive silver halide emulsion layer, a stripping layer soluble in photographic processing solutions between said temporary support and said permanent support, wherein said light sensitive emulsion contains as a surfactant, the condensation product of a secondary or tertiary aliphatic alkylolamine and an aliphatic acid having from 12 to 22 carbon atoms.

3. A photographic stripping film comprising a cellulose acetate temporary support, a cellulose nitrate permanent support having coated thereon, a light sensitive silver halide emulsion layer, and having between said temporary support and said permanent support, a layer of a water-insoluble colloidal material incompatible with and strippable from said temporary support, wherein said silver halide emulsion layer contains as a surfactant, the condensation product of at least one molar equivalent of an alkylolamine other than a primary alkylolamine and one molar equivalent of a fatty acid selected from the class consisting of mono basic aliphatic fatty acids having from 12 to 22 carbon atoms.

4. A photographic stripping film comprising a cellulose organic ester temporary support, a cellulose ester permanent support carrying a light sensitive silver halide emulsion layer and having between said temporary support and said permanent support, a layer of a water-insoluble, colloidal material incompatible with the temporary support and strippable from said temporary support, wherein said silver halide emulsion layer contains the condensation product of at least one molar equivalent of an alkylolamine selected from the class of secondary and tertiary alkylolamines having no more than a total of nine carbon atoms and one molar equivalent of a fatty acid selected from the class consisting of mono- and di-basic aliphatic fatty acids having from 12 to 22 carbon atoms.

5. A photographic stripping film according to claim 1 wherein said surfactant is the condensation product of diethanolamine and coconut oil fatty acids.

6. A photographic stripping film according to claim 1 wherein said surfactant is the condensation product of dodecenyl succinic anhydride and β-diethylaminoethanol.

7. A photographic stripping film according to claim 2 wherein said surfactant is the condensation product of diethanolamine and coconut oil fatty acids.

8. A photographic stripping film according to claim 2 wherein said surfactant is the condensation product of dodecenyl succinic anhydride and β-diethylaminoethanol.

9. A photographic stripping film according to claim 3 wherein said surfactant is the condensation product of diethanolamine and coconut oil fatty acids.

10. A photographic stripping film according to claim 3 wherein said surfactant is the condensation product of dodecenyl succinic anhydride and β-diethylaminoethanol.

11. A photographic stripping film according to claim 4 wherein said surfactant is the condensation product of diethanolamine and coconut oil fatty acids.

12. A photographic stripping film according to claim 4 wherein said surfactant is the condensation product of dodecenyl succinic anhydride and β-diethylaminoethanol.

References Cited in the file of this patent

UNITED STATES PATENTS 2,370,321  Mueller _____ Feb. 27, 1945